United States Patent
Garcia et al.

(10) Patent No.: US 10,121,202 B1
(45) Date of Patent: *Nov. 6, 2018

(54) INSURANCE COVERAGE CHECKER SYSTEM

(71) Applicant: Progressive Casualty Insurance Company, Mayfield Village, OH (US)

(72) Inventors: Wendy Courtney Garcia, Kirtland, OH (US); Elke Marie Blankenship, Garfield Heights, OH (US); Charles Allen Kordes, Cleveland, OH (US); Michael Vincent Esposito, Aurora, OH (US); Raymond Scott Ling, Westlake, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 608 days.

This patent is subject to a terminal disclaimer.

(21) Appl. No.: 14/029,424

(22) Filed: Sep. 17, 2013

Related U.S. Application Data

(60) Continuation-in-part of application No. 13/364,953, filed on Feb. 2, 2012, now Pat. No. 9,916,625, and a
(Continued)

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC ..... G06Q 40/08; G06Q 40/00; G06Q 30/0601
See application file for complete search history.

(56) References Cited

U.S. PATENT DOCUMENTS

| | | | |
|---|---|---|---|
| 8,755,779 B1 * | 6/2014 | Burks .................. | H04W 4/043 455/404.1 |
| 9,020,837 B1 * | 4/2015 | Oakes, III .......... | G06Q 30/0271 705/26.1 |

(Continued)

FOREIGN PATENT DOCUMENTS

WO    WO2001075760    *   3/2000   ............. G06Q 40/00

OTHER PUBLICATIONS

TransChoice System, Demonstration of TransChoice System, Jun. 29, 2005, pp. 1-59.*

(Continued)

*Primary Examiner* — Kirsten S Apple
*Assistant Examiner* — Mike Anderson
(74) *Attorney, Agent, or Firm* — Brinks Gilson & Lione

(57) ABSTRACT

An automated system allows users to request one or more insurance quotes through a self-service and/or agent-service communication channel. The system includes an interface that may receive user data from a remote or local system or application. A front-end application or system selectively passes a user's data to a record keeping system. A quote server or a quote processor generates one or more insurance quotes that are customized to the user's price and/or coverage preferences. A recommendation engine recommends one or more insurance coverages based on the information known about that user and in some instances, based on information known about others. The recommendation engine may call attention to selected insurance coverages that do not include a coverage feature or match a recommended coverage level.

10 Claims, 13 Drawing Sheets

Related U.S. Application Data continuation-in-part of application No. 13/864,687, filed on Apr. 17, 2013, now Pat. No. 9,183,593, which is a division of application No. 12/482,111, filed on Jun. 10, 2009, now Pat. No. 8,433,588.

(60) Provisional application No. 61/703,119, filed on Sep. 19, 2012.

(56) References Cited

U.S. PATENT DOCUMENTS

| | | | | |
|---|---|---|---|---|
| 2001/0021914 A1* | 9/2001 | Jacobi | ............... | G06Q 30/02 705/14.53 |
| 2001/0023404 A1* | 9/2001 | Ogawa | ............... | G06Q 30/02 705/4 |
| 2002/0055861 A1* | 5/2002 | King | ............... | G06Q 10/10 705/4 |
| 2002/0188484 A1* | 12/2002 | Grover | ............... | G06Q 40/00 705/4 |
| 2007/0100670 A1* | 5/2007 | Celona | ............... | G06O 30/0204 705/4 |
| 2007/0136109 A1* | 6/2007 | Yager | ............... | G06Q 40/00 705/4 |
| 2008/0052134 A1* | 2/2008 | Nowak | ............... | G06Q 10/10 705/4 |
| 2010/0169209 A1* | 7/2010 | Kornegay | ............... | G06Q 20/102 705/38 |
| 2010/0223078 A1* | 9/2010 | Willis | ............... | G06Q 40/08 705/4 |
| 2011/0276427 A1* | 11/2011 | McNall | ............... | G06Q 30/06 705/26.4 |
| 2012/0066004 A1* | 3/2012 | Lee | ............... | G06Q 40/08 705/4 |

OTHER PUBLICATIONS

Microsoft Cluster Server, Wikipedia, Nov. 5, 2005 (Year: 2005).*
Murphy, Kim; Microsoft® SQL Server™ with Failover Clustering; Apr. 2001 (Year: 2001).*

* cited by examiner

FIGURE 4

Figure 7:
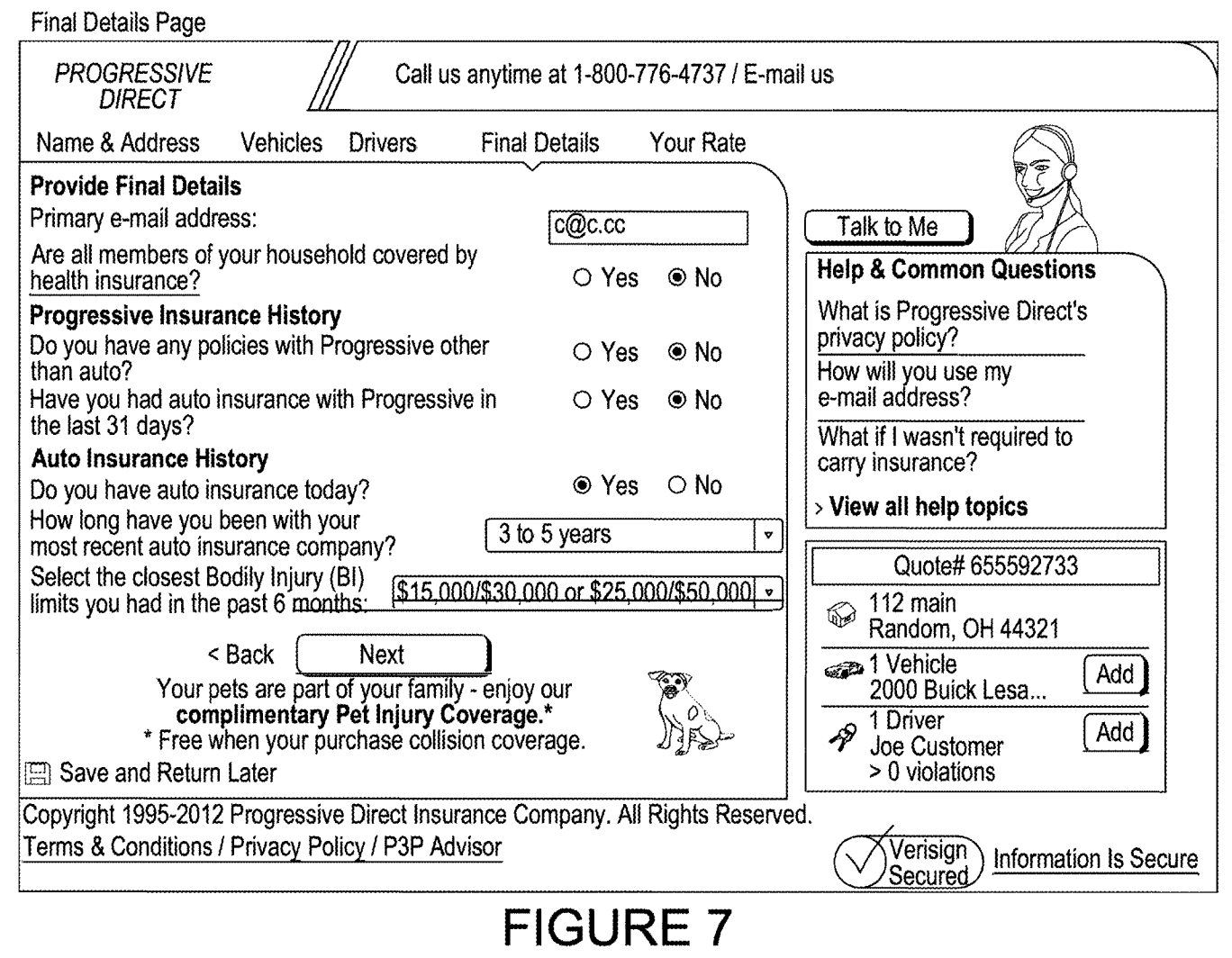

Final Details Page

PROGRESSIVE DIRECT | Call us anytime at 1-800-776-4737 / E-mail us

Name & Address | Vehicles | Drivers | Final Details | Your Rate

Provide Final Details
Primary e-mail address: [c@c.cc]
Are all members of your household covered by health insurance? ○ Yes ● No

Progressive Insurance History
Do you have any policies with Progressive other than auto? ○ Yes ● No
Have you had auto insurance with Progressive in the last 31 days? ○ Yes ● No

Auto Insurance History
Do you have auto insurance today? ● Yes ○ No
How long have you been with your most recent auto insurance company? [3 to 5 years ▾]
Select the closest Bodily Injury (BI) limits you had in the past 6 months: [$15,000/$30,000 or $25,000/$50,000 ▾]

[ < Back ]  [ Next ]

Your pets are part of your family - enjoy our complimentary Pet Injury Coverage.*
* Free when your purchase collision coverage.

☐ Save and Return Later

Copyright 1995-2012 Progressive Direct Insurance Company. All Rights Reserved.
Terms & Conditions / Privacy Policy / P3P Advisor

Talk to Me

Help & Common Questions
What is Progressive Direct's privacy policy?
How will you use my e-mail address?
What if I wasn't required to carry insurance?
› View all help topics Quote# 655592733
112 main
Random, OH 44321
1 Vehicle
2000 Buick Lesa... [Add]
1 Driver
Joe Customer [Add]
> 0 violations (Verisign Secured)  Information Is Secure

INSURANCE COVERAGE CHECKER SYSTEM

PRIORITY CLAIM

This application claims the benefit of priority from U.S. Provisional Application No. 61/703,119 filed Sep. 19, 2012, entitled Insurance Coverage Checker System and is a continuation-in-part of U.S. application Ser. No. 13/864,687, entitled Customizable Insurance System filed Apr. 17, 2013, which is a continuation of U.S. application Ser. No. 12/482,111, entitled Customizable Insurance System filed Jun. 10, 2009, and is a continuation-in-part of U.S. application Ser. No. 13/364,953, filed Feb. 2, 2012, entitled Mobile Insurance Platform System, each of the applications are incorporated herein by reference.

BACKGROUND OF THE INVENTION

1. Technical Field

This disclosure relates to insurance devices, systems, and methods, and more particularly to an architecture that recommends insurance coverages and enables users to customize insurance quotes.

2. Related Art

Insurance companies insure against risk in return for a premium. Some insurance companies offer a number of insurance policies that indemnify against losses. The policies may vary by coverage and price.

While some minimal insurance coverage is established by state regulation, the minimal requirements do not ensure that customers understand how much insurance coverage will adequately protect them. When offered through a self-servicing channel, customers or prospects may purchase inadequate coverage (a very low level of insurance coverage or a very high level of insurance coverage) due to their lack of experience or understanding of insurance coverage.

SUMMARY

An automated system allows users to request one or more insurance quotes through a communication channel. The system includes an interface that may receive user data from a remote or local system or application. A front-end application or system selectively passes a user's data to a record keeping system. A quote server or a quote processor generates one or more insurance quotes that are customized to the user's price and/or coverage preferences. A recommendation engine recommends one or more insurance coverages based on the information known about that user and in some instances, based on information known about others. The recommendation engine may also call attention to selected insurance coverages that do not include a coverage feature or match a recommended coverage level. The recommendations may be transmitted to the user.

Other systems, methods, features, and advantages of the inventions will be, or will become, apparent to one with skill in the art upon examination of the following figures and detailed description. It is intended that all such additional systems, methods, features and advantages be included within this description, be within the scope of the inventions, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIGS. 3-13 are exemplary Web pages that may be generated by the insurance architecture and processes shown in FIGS. 1 and 2.
Appendices 1-10 are alternative exemplary Web pages that may be generated by the insurance architecture and processes shown in FIGS. 1 and 2.

DETAILED DESCRIPTION OF THE PREFERRED EMBODIMENTS

This disclosure provides an insurance architecture that generates customized insurance quotes and delivers customized coverage recommendations. The insurance architecture collects information at a virtual site directly from a user that may include a prospective customer, an existing customer, an insurance agent, etc. The system allows the user to directly select or enter details about themselves, vehicles and/or other drivers and in some systems, the effective dates of an insurance policy and/or a renewal term. The system leverages data by recommending one or more insurance coverages and generating one or more customized insurance quotes in real-time. The recommendations may be based on information known about the user and/or others that are correlated to them or may be correlated to them within a predetermined deviation. A real-time recommendation or real-time customized quote are those in which a machine generated recommendation or customized quote matches a user's (e.g., human's) perception of time or those in which a computer processes data at least as fast as (or perceived to be at least as fast as) data is received.

Figure 1:
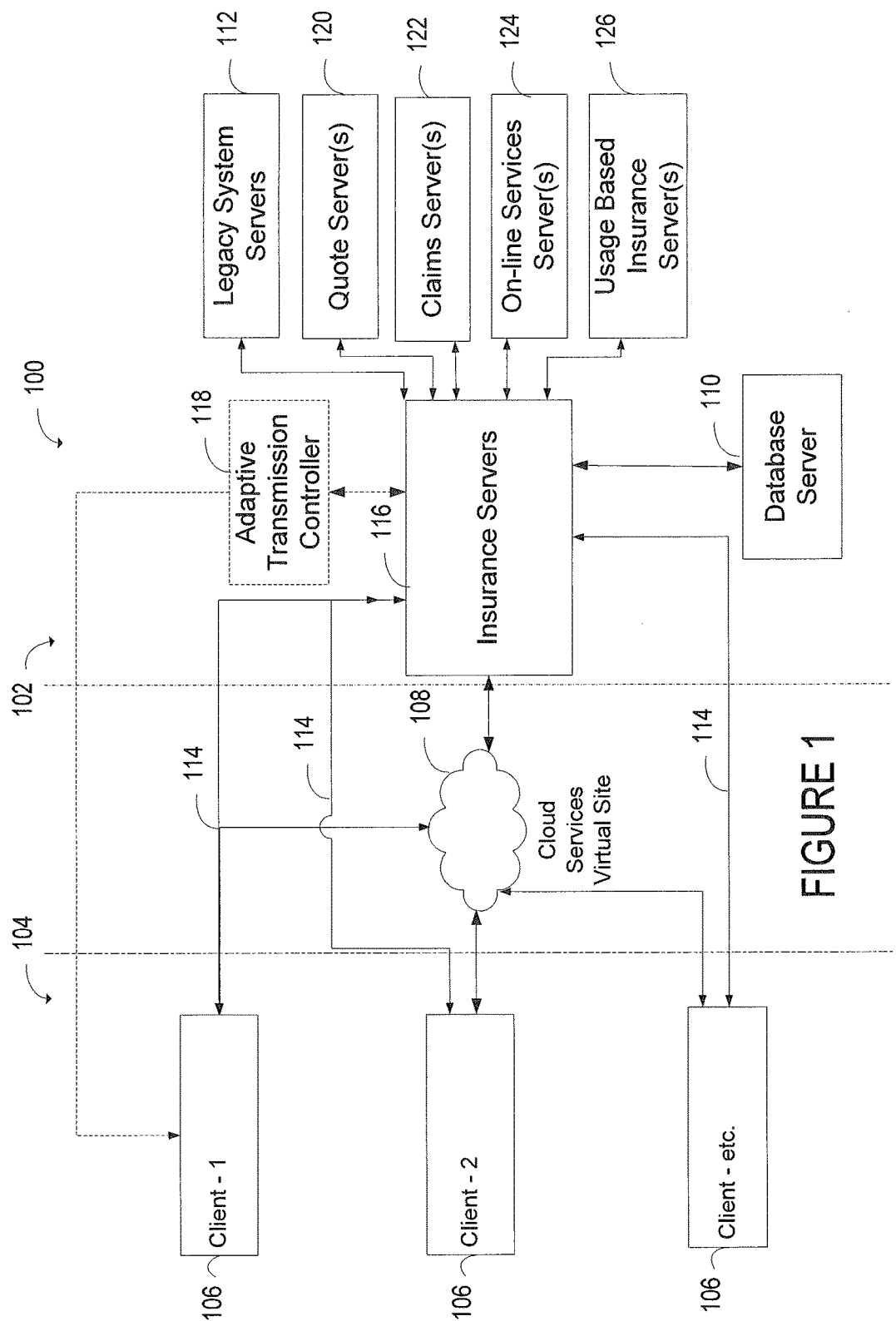
FIG. 1 is a block diagram of an exemplary architecture.

FIG. 1 shows an insurance architecture 100 that supports a user and one or more insurance providers or insurance intermediaries. The insurance providers or insurance intermediaries (referred to as the "insurer's side" 102 or the "back-end" 102) may comprise one or more servers (e.g., computers that respond to commands from a client) that operate and appear to the client side 104 as a single server. The clustering of the insurer's side or back-end 102 improves capacity by, among other things, enabling the devices or computer servers in the cluster to shift work and balance loads. The insurance architecture 100 may enable one or more devices or servers to take over for another, to enhance network stability, and minimize or eliminate downtime caused by application or system failure.

The client side 104 and insurance back-end 102 may include one or more components or modules that may be implemented in software, hardware, or a combination of software and hardware. The system may enable the transmission and reception of any type or combination of information including video, audio, and/or other data received exclusively through a tangible medium (e.g., conductive mediums, optical mediums, etc.), through the air, or through a combination of a wireless medium and a tangible medium. Some client devices (e.g., applications and/or systems) 106 interfaces, are integrated to, or are a unitary part of wireless communication devices, such as cell phones, wireless phones, personal digital assistants, two-way pagers, smartphones, portable computers, vehicle based devices, or other such devices that include one, two, three or more processors such as portable processors (e.g., central processing units, digital processing units, graphical processing units, slave processing units, etc.) that interface a local storage device or virtual (or remote) storage resources such as a cloud-based storage resources 108.

On-line cloud storage resources 108 or local or remote storage device may include nonvolatile memory (e.g., memory cards, flash drives, solid-state devices, ROM/ PROM/EPROM/EEPROM, etc.), or volatile memory (e.g., RAM/DRAM, etc.), that may retain a database or are part of the database server(s) 110 or cluster (shown on the insurer's side 102, but may also serve the client side 104 and/or the network side exclusively or in combination) that retains data in a database structure and supports a database sublanguage (e.g., structured query language, for example) that may be used for querying, updating, and managing data stored in a local or distributed memory of the databases. The database (also referred to as a record keeping system) is accessible through a database engine or a software interface between the database and user that handles user requests for database actions and controls database security and data integrity requirements. The client device 106 may be a part of or configured to communicate with or through one or more tangible devices, such as a remote computer, a laptop computer, a set-top box, a customized computer system such as a game console, and other devices, for example.

The interface 114 linking the client device(s) 106 to the insurer's side 102 may convey commands and information or data between the client side 104 and the insurer's side 102, such as notifications, sharing, uploading, downloading, importing etc., in part or exclusively through a publicly accessible distributed network or the Internet. The commands and data that are exchanged between the client side 104 and the insurer's side 102 may be processed without the originating side "knowing" any of the working details or resources provided by the receiving hardware, software, or the resources themselves (e.g., its device/server agnostic). The communication may occur through an extensible markup language (XML), hypertext markup language (HTML), applets, etc. that may include the ability to change and update content dynamically.

As shown in FIG. 1, the insurance architecture may provide access to quote server(s) 120, claims server(s) 122, service server(s) 124, usage based insurance server(s) 126, legacy server(s) 112, storage resources, and other servers that may comprise one or more computers that are a part of or interface the insurer's side 102. The insurance architecture in FIG. 1 includes an optional adaptive transmission controller 118 that may process content and video (e.g., mobile content) in multiple mobile versions optimized for different variables, such as different screen sizes, resolutions, operating systems, and plug-ins. A plug-in may comprise a small software program that plugs into a larger application program retained in a non-transitory media to provide added functionality and/or permit access and execution of files, objects, data, etc. embedded in documents, files, and/or data that may not otherwise be recognized. When a message is received at the insurer's side 102, the adaptive transmission controller 118 may transmit content received from the insurer's server 116 that is formatted to the correct size of the designated client device 106. Some adaptive transmission controllers 118 use graphic video chips and graphic processors that are configured to manipulate superfast content, instead of relying on traditional server controls that may rely exclusively on central processing units. Through the use of a parallel processing architecture, some adaptive transmission controllers 118 may deliver faster than real-time encoding and multiple adaptive bit rate outputs, to deliver multiple resolutions, and deliver output formats in real-time or near real-time that target a variety of mobile devices 106 and operating platforms including Microsoft, Adobe, and Apple's systems, to name a few.

Figure 2:
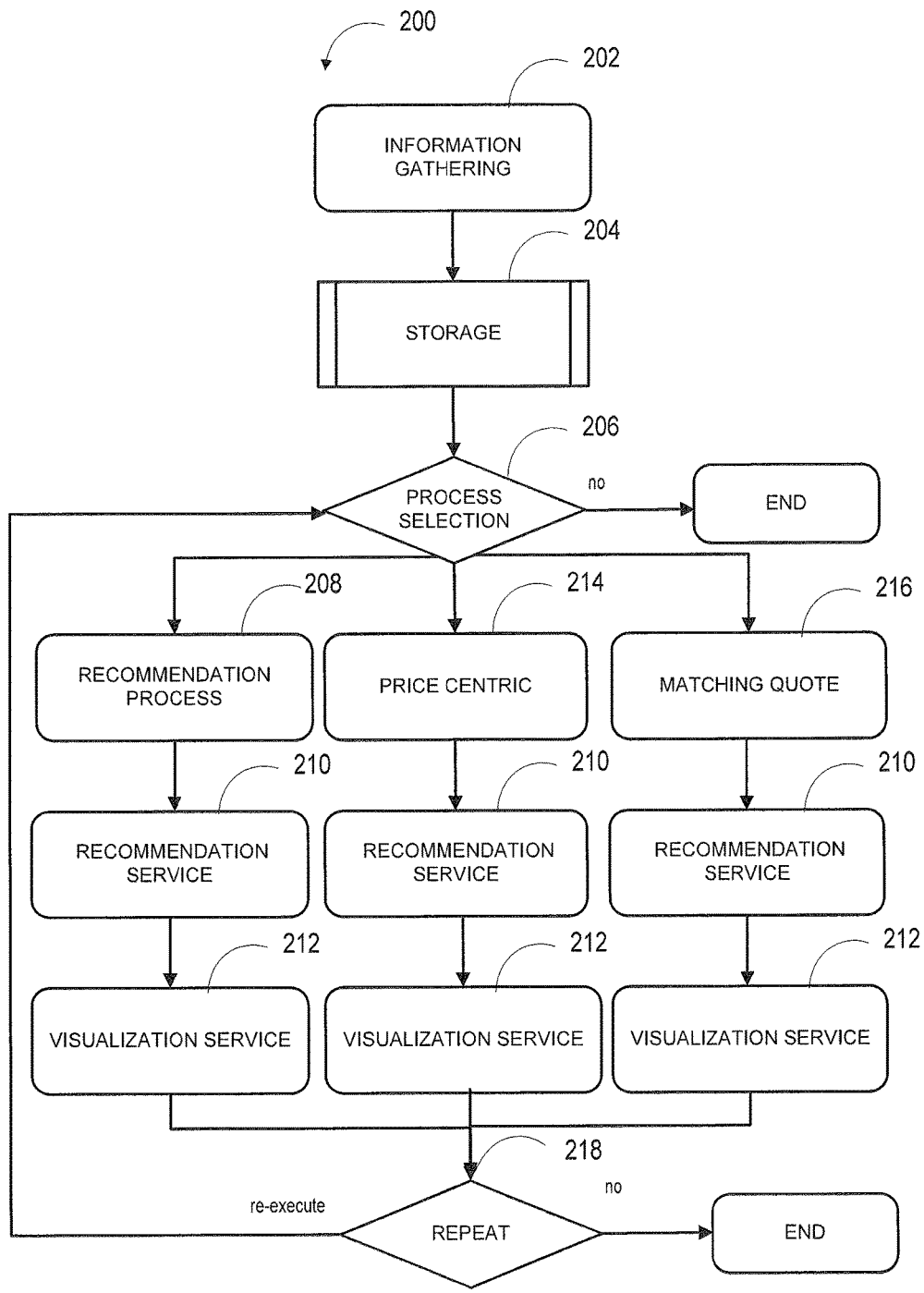
FIG. 2 is an exemplary flow diagram

An exemplary insurance process 200 shown in FIG. 2 provides a unique coverage counseling experience and generates an insurance quote and one or more insurance coverage recommendations to a local or remote interface. An information gathering process 202 (or insurance server 116) may receive or solicit information needed to process quotes such as a customer or prospect's data that may include first name, last name, date of birth, mailing address, city, state, zip, homeownership status, time since last moved, date of birth, social security number, level of education, health insurance coverage, marital status, gender, license status, vehicle data (that may include year, make, model/sub-model, etc.), accident frequency, and/or insurance history. A quick-fill process may provide or suggest some of the requested data automatically to the insurer's side 102. In some processes 200 selected information may also be pre-filled or validated automatically by serving data stored in legacy servers 112, or third party systems. For example, if credit information is relevant to an insurance quote or insurance coverage recommendation, the information gathering process 202 may identify a prospect's residence through the legacy server 112 and access a centralized reporting site that aggregates credit reports from Equifax, Experian, and/or TransUnion directly.

Once the information is stored at 204, some insurance processes or servers may offer other insurance products, discounts, and enrollment opportunities in other programs. An exemplary program may offer insurance discounts based on a prospect's actual driving record that may render one or more insurance ratings (e.g., a position assigned on an insurance scale), safety ratings, insurance scores, and/or driver scores. An exemplary program may include the systems and processes described in Vehicle Monitoring System that is filed as U.S. application Ser. No. 12/132,487, which is incorporated herein by reference (e.g., see foreground of FIG. 8).

Through the exemplary insurance process 200, a prospect may customize his or her plan types, coverages, etc. For example, in FIG. 2, one or more processes for selecting coverages or an insurance server 116 may be provided through a recommendation process, a price-centric or name your price process, such as the process and systems described in U.S. application Ser. No. 12/482,111 or by generating a matching quote based on a prospect's existing insurance coverages. In some exemplary insurance processes a graphical user interface provide a means for selecting one of the processes for selecting insurance coverages within an option selection area, such as a dialog box at 206. Selecting one radio button associated with a coverage selection process deselects a previously selected coverage selection process, so only one coverage selection process is selected at a given time. In alternative systems, check boxes may be used when more than one coverage selection processes is requested that may be served in a sequence at 218, or alternatively, multitasked.

Two, three, or more customized insurance packages rendered by the quote server 120 may be generated and displayed in other option-selection areas when a coverage selection process is chosen 208 or 214. Interactive-user interface options (via one or more interactive-toggle buttons) may display a cost aggregate of one or more groups of insurance packages that may have different line-coverages. For example, a recommendation process 208 may offer a basic insurance coverage package, a choice package, and a recommended insurance package that when selected, displays the line-coverages and their associated line-coverage costs, that make-up that insurance package. A user may select or change the line-coverages to personalize them, often through a touch or with the help of a relative or absolute pointing device. Upon a selection, an interactive information retrieval process retrieves and transmits the line coverages associated with the selected customized insurance packages and renders policy details when an offering is selected. The line coverages may be further customized directly by the user, and the customization persisted to a local or cloud-based service 108 should a user select another insurance package offering. The interactive user interface may provide the user with an easy-to-use alternative to return to their prior customized insurance coverage selections instead of requiring the user to memorize customized coverages and pricing.

When enabled, a recommendation service 210 and an on-screen visualization service 212, provided through a recommendation engine resident to the quote server 120 or insurance server 116, may recommend insurance coverage levels in each of the personalized insurance packages that are offered. When line-coverages change, an exemplary recommendation service 210 and/or on-screen visualization service 212 may transmit custom commands, visualization data, or visual information to one or more remote clients 106 that causes selected line coverages appearance to change or become highlighted when that change does not include a recommended coverage feature or exceeds and/or falls below a predetermined insurance coverage level (referred to as a recommended insurance coverage). In some processes, the highlighting or change dissolves, fades, or disappears when a recommended line-coverage is chosen by a user. In other exemplary insurance processes the highlighting or change may dissolve, fade, or disappear when acknowledged by a user (e.g., a manual acknowledgement or voice command) or when a programmable time or pre-programmed time period expires. In the exemplary insurance processes of FIG. 2, a highlight alters the appearance of the displayed characters as a means of calling attention to them, as by displaying them in a reverse video that may simulate a fluorescent marker or highlighter shading (e.g., a light shading of darker font, display a selection with greater intensity, etc.). A highlighting may be used to indicate an item is to be acted on.

In some insurance processes 200, the sequence of line-coverages, (which may include liability coverage, such as bodily injury & property damage liability, uninsured/underinsured motorist bodily injury medical payments, etc.; and vehicle coverage such as collision, rental car, roadside assistance, etc.) listed in the line-coverage area may be arranged in a pre-determined order and may receive different highlighting based on social factors (e.g., the order may be based on user activity at a site, user activity during the information gathering process 202, or may be based on demographic data that reflects interest in select line-coverages in comparison to others, etc.). In other processes the sequence may be based on an alphabetical order, a random order, or through other criteria that in some implementations may reflect prospects' aversion to risk and/or expected preferences.

As explained, the recommendation service 210 and visualization service 212 may be rendered through a recommendation engine. The recommendation engine may generate recommendations for insurance coverage levels based on programmable business rules and user selections and/or preference data, for example, and may highlight differences. In some exemplary recommendation service processes 210 the profiles, programmable rules, and/or scripts are generated through data mining. Prior to making a recommendation, demographics files are generated periodically based on geographic and socioeconomic data. Geo-centric classes may be created that group addresses by zip code +4 or alternatively by county on an actual or estimated average net worth. A mapping of geo-centric classes with the primary named insured's age, homeownership status, and prior insurance information may generate liability rules or profiles. The liability rules or profiles may be programmed into scripts that recommended liability limits for the prospect or customer. Some liability rules or profiles may reflect required insurance coverages, such as those required by leasing agents or a state's regulations. For example, if a customer is leasing a vehicle, $100,000 liability coverage per person and $300,000 per accident bodily injury limits may be included due to the leasing agent's minimum liability requirements. Likewise, if a prospect owns a home, a rule may recommend liability limits that exceed a percentage of the prospects estimated assets to protect the prospect.

When a selection of a line-coverage is different from a recommended line-coverage, it may be highlighted (e.g., changing the appearance as a means of calling attention to it) and when a hyperlink associated with the highlight is selected by a user, the quote server 120 automatically yields details of other related line-coverages and their associated prices. The prices associated with the other line-coverages may be shown as relative prices in comparison to the recommended-line coverage, relative prices with respect to a user selection, and/or as standalone prices showing their respective cost contribution to that level of insurance coverage. In other words, the price associated with another line-coverage may represent an incremental difference between that selection and a cost of a recommended line-coverage. When part of a Web page or Web site, such details may be presented through one or more anchored or floating pop-up windows that may call out further details, including coverage options, associated with a graphical color coded bar graph, for example (represented in the Appendix). An anchored or floating pop-up window may include a scroll bar and multiple active areas for moving to an arbitrary line coverage option, for selecting a line-coverage, and for moving line-by-line through the details and/or offerings associated with the line-coverages.

In the exemplary insurance process 200 the on line-coverages are customized to a user's request through menu programs, such as an on-screen edit features that may be adjacent to a line coverage entry. When activated by clicking, selecting, actuating, or hovering a cursor over an icon an item, a dialog balloon, pop-up menu, or drop-down menu may appear. Some menus and balloons in alternative insurance processes 200 may provide information, advice, and price reasoning for a recommend change. For example, one or more explanations as to what a coverage does, how much coverage is needed, frequency of claims associated with a particular line-coverage, and likelihood of a payment above a certain price threshold based on national loss data may be rendered through an on screen help feature in the form of a help window or a cartoon-like dialog balloon may appear when a user positions a cursor over an icon or element or makes a selection that is not recommended (e.g., see Appendices).

Through the exemplary insurance process 200, a prospect may customize his or her premium, plan type, coverages, deductibles, effective policy date, etc., through a price-driven process. As explained, some exemplary insurance processes render a graphical user interface that allows users to select a coverage selection process by selecting a radio button. When a selection actuates a price-centric process associated with a customized insurance package (like the process and systems described in Customizable Insurance System that is U.S. application Ser. No. 12/482,111), the recommendation service 210 and the other descriptions described herein may be enabled, which recommends insurance coverage levels and calls out differences between a recommended line-coverage and each of the selected line-coverages. The recommendation service may also include the alternative features and counseling features described herein in alternative coverage selection processes associated with the price centric process 214. For example, some exemplary counseling that may be enabled is shown in the Appendix. Similarly, a user may select a matching quote 216 by selecting a quote based on a prospect's existing insurance coverages. Thereafter, the recommendation services, on-screen visualization services, and other descriptions described herein may be enabled in this coverage selection process.

Figure 3:
Figure 5:
Figure 6:

A prospect or insured or insurance representative, such as insurance agent, or a user may enter information into an automated insurance system or the processes described above in many ways. A prospect may call and convey his or her information by telephone to an insurance agent or an insurance representative, convey information in person in an insurance agent's or representative's office, or enter information directly through a remote computer online or off-line allowing the information to be received by the automated insurance system in real time or after some delay. Whether information is collected off-line, online, or through a representative, the information may be entered through an interface. Some interfaces may be generated by a client-side script (e.g., JavaScript) and/or flash application that render an entry screen that may look like the Web page shown in FIG. 3.

Figure 4:
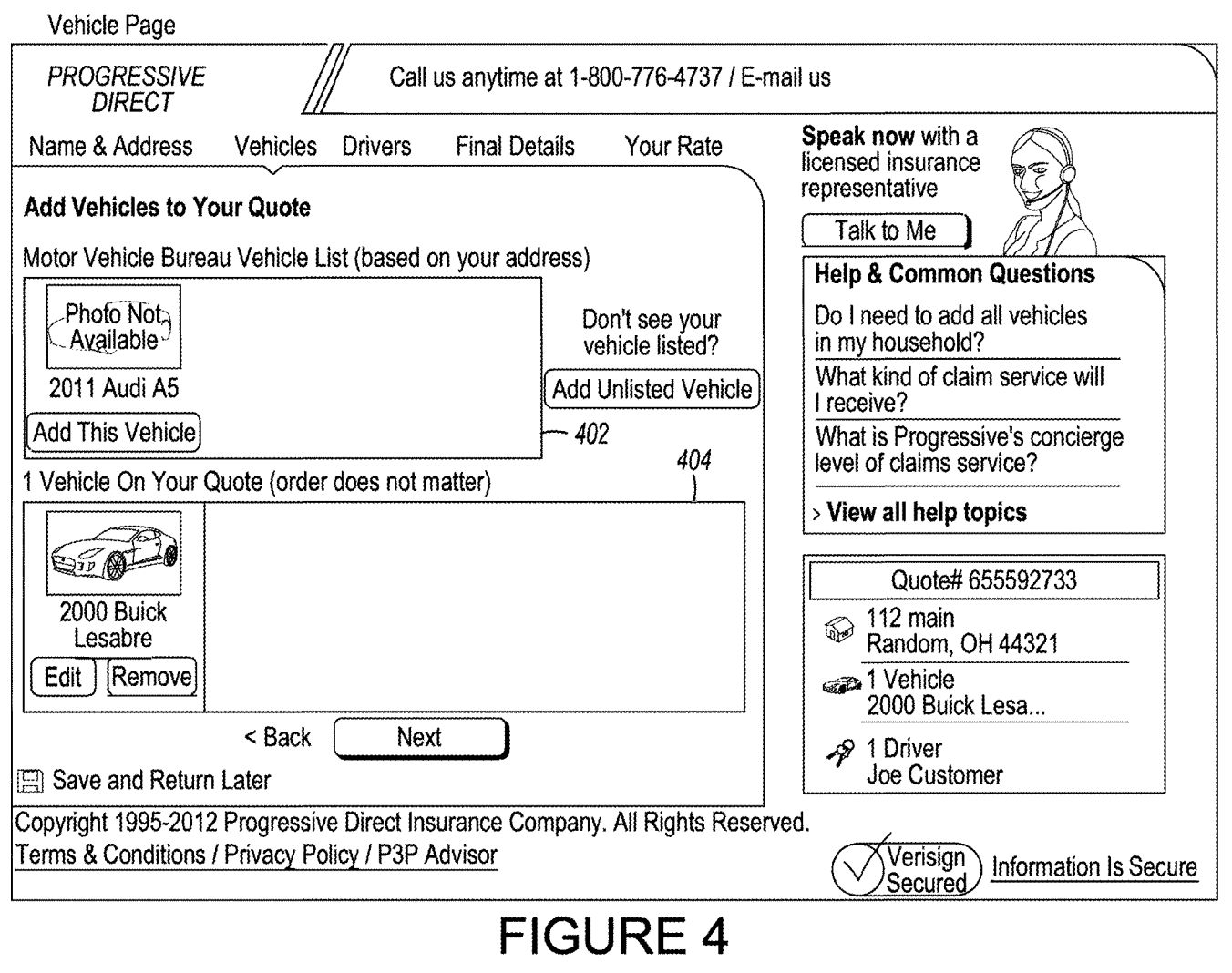

When personal information is entered (e.g., name, address, date of birth) the insurer's side 102 may gather information automatically by harvesting third party data providers' records from remote servers or clusters in real-time. In FIG. 4, a visual control, such as a selection bar 402, is populated with images of vehicles being quoted, which are retrieved through one or more databases of motor vehicles records and images that may be served by a remote or local insurance server 116 or cluster. When a user selects or clicks on a vehicle image, the selected vehicle image moves to the quote bar 404 before a user is prompted by a hyperlink to advance to the next page. Objects that provide access to representative help features and summaries may be tagged to other objects or anchored to positions on one or more pages to keep these objects in view or at certain positions on pages or documents.

Additional details may be solicited to underwrite a quote. Client-side scripts (e.g., JavaScript) and/or flash applications may render other entry screens that may look like FIGS. 5-8 (e.g. an information Web page, a vehicle Web page, a Vehicle Details Web page, a Driver details Web page, a Final Details Web page, and Pre-Rates Selection Offer Web page). The details sought through these screens may include details about where the vehicle is kept (zip code+4), whether the vehicle is owned or leased (e.g., own and make payments, owned and do not make payments, lease), marital status (e.g., single, married, widowed, divorced), primary residence (e.g., own house/condominium/mobile home, other), U.S. license status (e.g., valid, permit, suspended, permanently revoked), U.S. social security number, whether an applicant recently moved (e.g., in the last sixty days, other periods), was involved in an accident, cited for violations, or filed any insurance claims within a period (e.g., sixty days, thirty six months, etc.), covered by health insurance, insurance history, email address, and/or other information. The information may be gathered through menu programs, dialog boxes, radio buttons, and other features that may receive information through a graphical user interface, or gathered from third party resources harvested through one or more of the servers on the insurer's side 102 such as a quote server 120.

Figure 8:
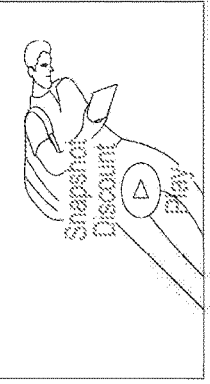

After the information (e.g., quote information) is gathered and stored on the client or insurance server 116 or database server 110, a rate delivery page offer personalized insurance packages may be rendered. A graphical user interface shown in FIG. 8 provides a means for selecting between a personalized coverage package, a name your price quoting process, and a matching quoting process within an option selection area 802. Selecting one radio button 804 associated with one coverage selection process deselects a previously selected coverage selection process, so only one coverage selection process is active at a given time. If previously accessed, the state of the other selection processes may be persisted in memory or into cloud services 108.

Figure 9:
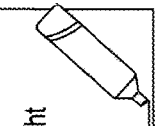
Figure 10:
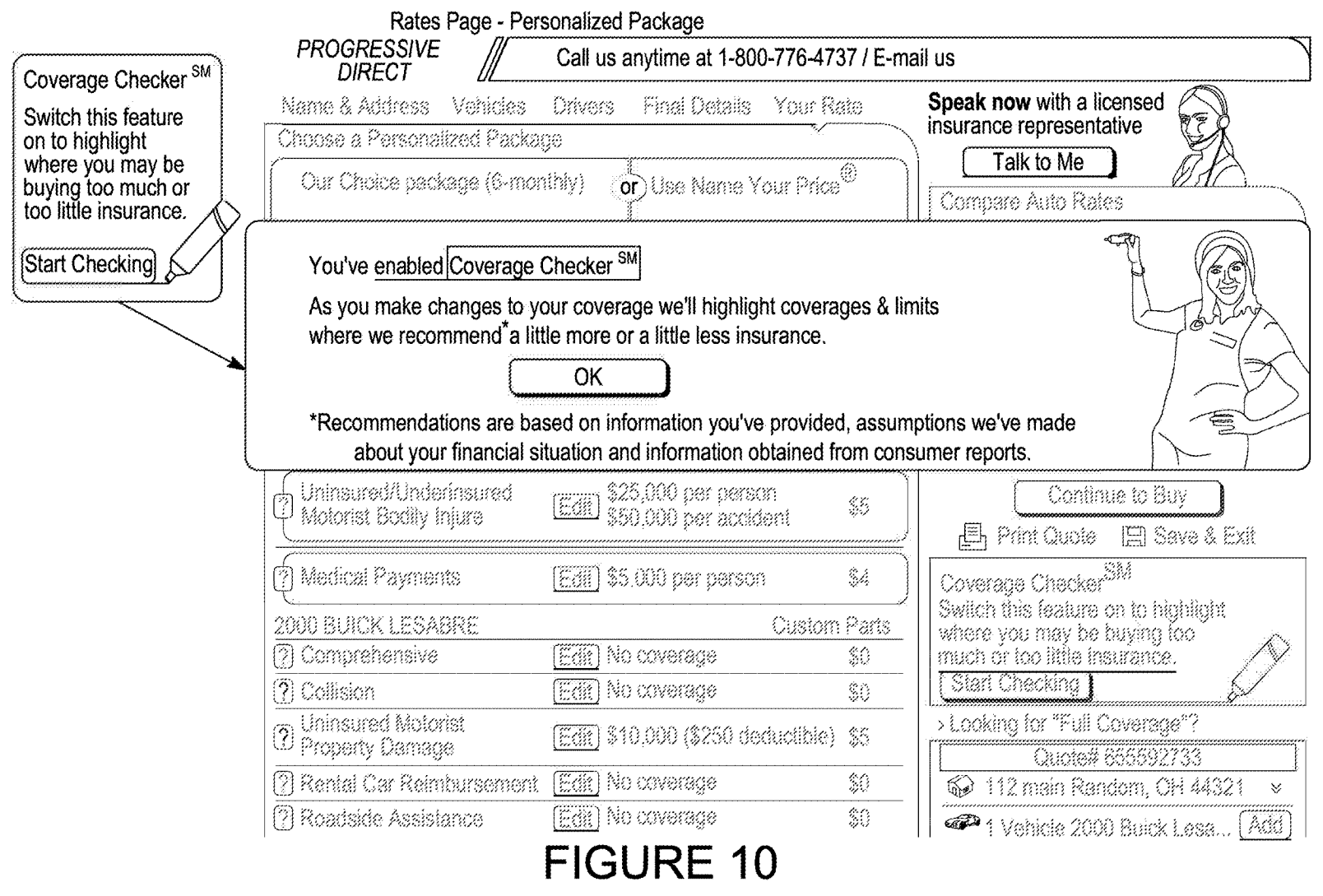
Figure 11:
Figure 13:

When a user selects a personalized coverage package, a rate delivery page offering a plurality of personalized packages is rendered allowing a user to select between three customized insurance packages as shown in FIG. 9. Interactive toggle buttons 902 allow users to select between different packages shown as "Basic $18.84" "Recommended $27.68" and "Our choice package $23.68". The displayed packages may reflect coverages required by law, loan sources, a prospect's current coverages, programmable business rules and user selections and/or preference data previously described, etc. The toggling of an interactive toggle button 902 (e.g., Basic $18.84) deselects or changes insurance coverages offered in that package, enabling as alternative coverage package (e.g., Basic $18.84) and aggregate price to be displayed within the option selection display area 904. The line-coverages shown in the line coverage area 906 of a page may change automatically to reflect the protection offered at that selection. When line coverages change in FIGS. 9, 11, and 13, their appearance may be highlighted when the recommendation service 210 and the on-screen visualization service 212 provided through the recommendation engine (that may residing on the quote server 120) is manually enabled, as shown in FIG. 10, to call attention to the line-coverage differences with the recommended line-coverages. In FIGS. 11 and 13, the differences are called out through a highlighter. The highlighting or change may dissolve, fade, or disappear when the insurance line-coverages are edited to a recommended insurance coverage, acknowledged by a user (e.g., a manual acknowledgement or voice command, for example) and/or when a programmable time or pre-programmed time period expires. In the Web pages shown in FIGS. 11 and 13, the highlight alters the appearance of the displayed characters as a means of calling attention to them.

When a selection of a line-coverage is different from a recommend line-coverage, it may be highlighted and yield details of other line-coverages and their associated prices as shown in FIG. 11. The prices associated with the other line-coverages may be shown as relative prices in comparison to the recommended-line coverage, relative prices with respect to a user selection as shown in 1102 and/or as standalone prices showing their respective cost contribution to that level of insurance coverage. In other words, the price associated with another line-coverage may be represented as an incremental difference between that selection and the cost of another selection or the recommended line-coverage for that coverage category. When part of a Web page or Web site, such details may be presented through one or more floating or anchored pop-up windows 1102 (one is shown) that may call out further details including coverage options associated with a graphical color coded bar graph (as represented in the Appendix), for example. The anchored or floating pop-up windows 1102 may include a number of active areas, some of which may allow the user to select between more than one alternative line coverages and enter the selection into their quote.

In the exemplary Web pages shown in FIGS. 9, 11, and 13 the line-coverages may be customized by a user through on-screen edit features that may be adjacent to a line-coverage entry. When activated, a drop-down menu appears offering alternative line-coverages and associated prices for the selected line-coverage. Some menus provide information, advice, and price reasoning for a recommend change (as represented in the Appendices). For example, one or more explanations as to what a coverage does, how much coverage is needed, frequency of claims in a line-coverage category, and the likelihood of a payment above a certain price threshold based on national loss data may be rendered through an on screen help feature in the form of a pop-up-help window or a balloon-help that may appear when a user positions a cursor over an icon or element or makes a selection that is not recommended.

Figure 12:
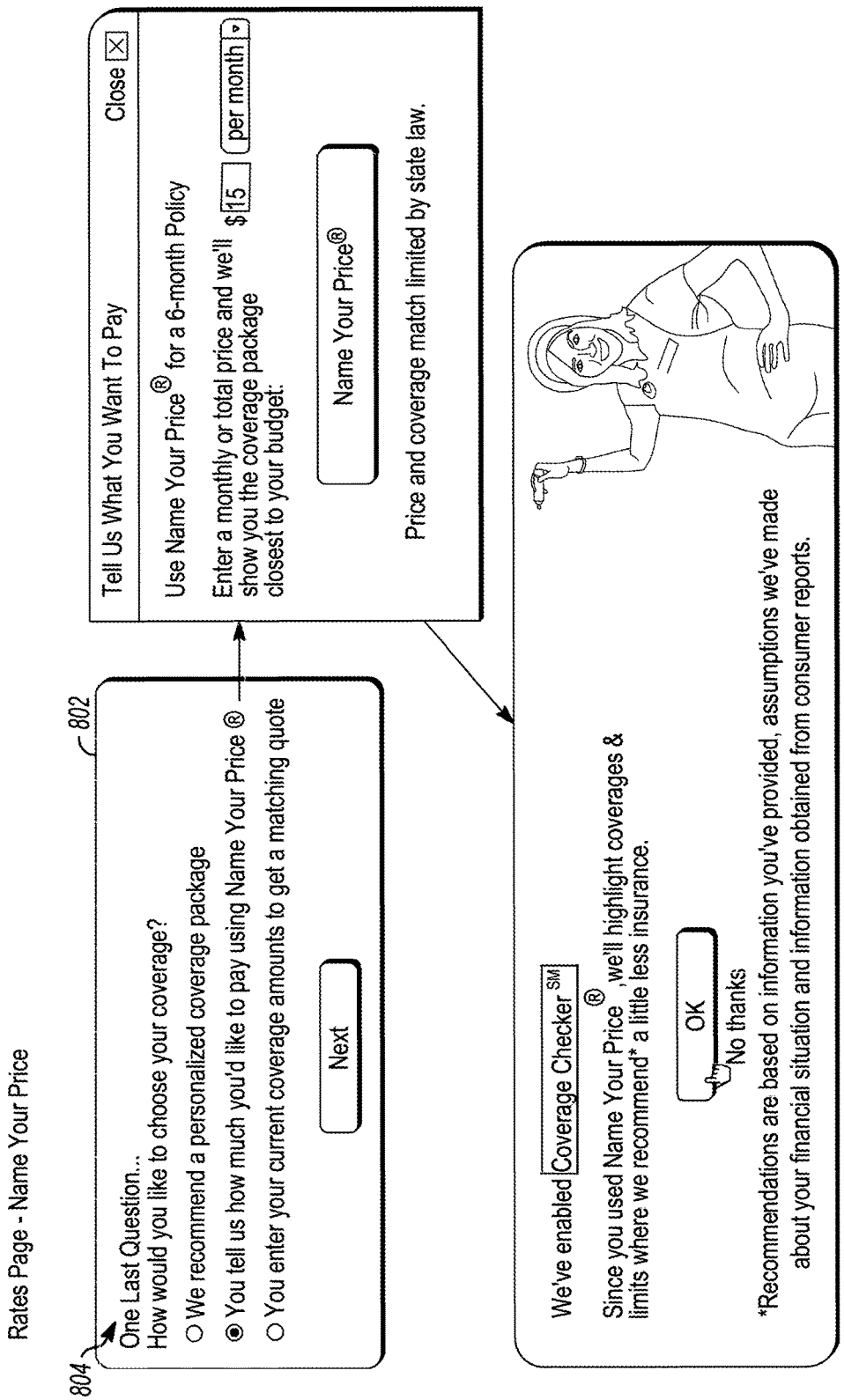

Through the exemplary Web pages of FIGS. 9-13 and the Appendices, a prospect may customize his or her premium, plan type, coverages, deductibles, effective policy date, etc. through a price-driven process. As explained, some exemplary insurance processes render a graphical user interface that allows users to select a coverage selection process by selecting a radio button as shown in FIG. 12. When a selection actuates a price centric process 214 associated with a customized insurance package, like the process described in process and systems described in Customizable Insurance System that is U.S. application Ser. No. 12/482,111, the recommendation service 210, on-screen visualization service 212, and other descriptions described herein may be enabled, which recommends insurance coverage levels in each of the line-coverages as shown in the exemplary Web page shown as FIG. 13. The recommendation service 210 may also include the alternative features described herein in the alternative processes. Similarly, a user may select a matching quote 216 by selecting a quote based on a prospect's existing insurance coverages with the same recommendation service 210, on-screen visualization service 1212, and other descriptions described herein.

Each of the systems, engines, methods, and descriptions described may stand alone or may be encompassed within or interface mobile devices (e.g., a client 106 may be a mobile client), remote computers, tablets, or in-vehicle devices, distributed amongst the servers shown in FIG. 1, and any other devices that access one or more publicly accessible networks. Some systems may enable a recommendation service 210, an on-screen visualization service 212, the recommendation engine, and the other systems and processes described herein based on a user's choice, attributes of the quoting system, and/or attributes of the user. A graphic element in a dialog box may be used, so that when activated, enables the recommendation and visualization services 210 and 212 and hardware (e.g. a user's choice). Quoting systems that focus on features other than recommended insurance coverages may automatically (without user input) enable the recommendation services 210, on-screen visualization services 212, recommendation engine, and software and/or hardware too. Similarly, prospects or consumers without insurance or without insurance experience may automatically receive the recommended insurance coverage services 210 and on-screen visualization services 212. The structures and functions described may provide recommendations based on different criteria too. For example the geo-centric profiles described may be based upon LandScan data linked to economic factors such as income data. Furthermore, it should be understood that while the plurality of customized insurance packages may differ with respect to recommended insurance coverages and costs, in some systems and processes, recommended coverages may not differ (e.g., they may not be mutually exclusive). Thus, a basic insurance coverage package and a choice package may be the same, and in other systems and processes, a choice package may be identical to a matching quote based on a prospect's existing insurance coverages.

The various uses of recommendation services and on-screen visualization services and all of the other systems, methods, and features described, may be applied to other quoting, marketing, or retention systems. For example, the systems and processes may be used in post-sales offers to existing insurance customers. Such systems and processes may automatically notify existing insurance customers of misalignments in their insurance coverage levels when compared to recommended insurance levels. The systems and processes may also resolicit prospects or consumers (e.g., a prospect or someone shopping for insurance) that do not buy an insurance quote to ensure their current coverage levels are adequate. Reselections may be generated automatically and transmit marketing notices automatically at fixed intervals and may be part of or in response to a mass marketing campaign or a marketing strategy that ignores market segment differences. In on-line serving of insurance policies the systems and processes may serve as a retention technique to ensure adequate insurance coverages to an existing insurance customer (e.g., someone that an insurer already has a business relationship with) at predetermined intervals, such as automatically sending electronic notices near a mid-term point of an insurance policy term or at or near a renewal period of an insurance policy. In each of the options described, the notice may occur through electronic mail, text messages, via social networking Web sites and other automated and/or electronic communication methods that provide access to screen renderings that may be referenced by or include hyperlinks. Further, the recommending of insurance coverages are not limited to automobiles, it applies to all structures for transporting persons or things (e.g., boats, watercrafts, motorcycles, airplanes, etc.) and all other insurable objects.

Other alternative insurance processes and/or insurance architectures may apply one or more coloring schemes and/or highlighting (e.g., impression characteristics) to call out insurance coverage recommendations, incorporate other mass marketing programs to tie an insurance company's marketing efforts to their quote flow, and improve the consistency of the quoting experience. Further it may support an architecture that integrates content that addresses frequently asked questions that may not be addressed or received in a quoting process. Such architectures may also support banner ads that may attract traffic to a Web site or other products, incorporate other marketing messages within or associated with a quote page, and provide a platform for testing marketing programs or ads.

The recommendation engines may reside on the quote server 120 or may be distributed between a quote server 120 and an insurance server 116 or may comprise a programmed processor. The processor may comprise one, two, or more central processing units that execute the instruction code, and access data from memory that generate, support, and/or complete an operation. The insurance coverage applications may support and define the functions of a processor that is customized by instruction code (and in some applications may be resident to any insurance quoting systems accessible through vehicles, communication systems, financial service systems, medical systems, etc.).

In some applications, the systems, methods, engines, and descriptions may be encoded in a non-transitory signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from insurance quoting enabled devices such as such as cell phones, wireless phones, personal digital assistants, two-way pagers, smartphones, portable computers, vehicle based devices, and any other devices that interface or include quoting technology. If the descriptions or methods are performed by software, the software or logic may reside in a memory resident to or interfaced to the one or more processors, devices, or controllers that may support a tangible or visual communication interface (e.g., to a display), wireless communication interface, or a wireless system.

The memory may retain an ordered listing of executable instructions for implementing logical functions. A logical function may be implemented through digital circuitry, through source code, or through analog circuitry. A "computer-readable storage medium," "machine-readable medium," "propagated-signal" medium, and/or "signal-bearing medium" may comprise a non-transitory medium that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a memory or database accessible by a database engine that provides access to a database management system. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Thus, an insurance architecture generates customized insurance products and delivers customized coverage recommendations. The insurance architecture collects information directly from users that may include a prospective customer and an existing insurance policy customer. The system allows the user to directly select or enter details about themselves, vehicles and/or other drivers and in some systems, the effective dates of an insurance policy and/or a renewal term. The system leverages data by recommending one or more insurance coverages, highlighting coverage discrepancies, and generating one or more customized insurance quotes in real-time. The recommendations may be based on information known about the user and/or others that are strongly correlated to them or may be strongly correlated to them.

The insurance architecture and processes may provide a unique counseling experience that enables customers to understand how much insurance coverage will adequately protect them and their assets and further understand the implications of buying very low and very high coverage levels. The architecture and processes instill confidence in the customer that they are adequately covered without being sold insurance coverages they do not need. The architecture and processes provide the content provider with a distinct marketable experience, heightened consideration, and an increased conversion of insurance quotes. The recommendation and on-screen visualization services 210 and 212 may compare a recommended insurance package against a prospects personalized insurance coverages to find discrepancies that may be highlighted to improve customer review and facilitate customer editing. It provides a better customer experience, provides more information to a customer, and provides the customer with a better understanding of their claim exposure.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

We claim:

1. An insurance architecture comprising:
    a quote services server comprising an insurance cluster programmed to cause mobile client devices to render comparisons of insurance plans, or insurance policy rates on the mobile client devices;
    an on-line services server resident to the insurance cluster programmed to respond to an on-line request from a native application client resident to one of the mobile client devices by transmitting data that renders a display of an existing insurance policy and renders updates to an existing insurance policy parameter;
    a quote server resident to the insurance cluster hosting a recommendation service coded to generate an insurer's recommended insurance package based on information received from at least one of the mobile client devices and to detect an insurance package selected by the at least one mobile client device from a plurality of insurance packages;
    a visualization service coded to update the display to highlight the differences between a plurality of insurance line-coverage levels that comprise the insurer's recommended insurance package and a second plurality of insurance line-coverage levels that comprise the insurance package selected by the one of the mobile client devices;
    an adaptive transmission controller coupled to the insurance cluster coded to process in parallel multiple versions of the insurer's recommended insurance package that are optimized to a plurality of screen sizes and resolutions of the mobile client devices;

where the quote server is coded to transmit a modified hyperlink element that comprises an encryption of a user's identity and identifiers of insurance products;

where activation of the modified hyperlink element connects a user to the insurance cluster, validates the user, and automates the user's logon process; and where the native application client accesses and processes insurance content without access to the Internet.

2. The insurance architecture of claim 1 where the insurance cluster executes code stored in a non-transitory media that renders claim services, policy services, and usage based services.

3. The insurance architecture of claim 1 where the quote server transmits visualization data to one or more mobile clients in response to a selection of an insurance package.

4. The mobile insurance architecture of claim 1 where the native application client is executed independently from a Web browser.

5. The mobile insurance architecture of claim 1 where the native application client is executed independently from an Internet Interface.

6. The insurance architecture of claim 1 where the recommendation service generates recommendations for insurance coverage levels based on programmable rules.

7. The insurance architecture of claim 6 where the programmable rules are based on demographics files and socio-economic data.

8. The insurance architecture of claim 1 where the adaptive transmission controller processes mobile content optimized to a plurality of operating systems.

9. The insurance architecture of claim 1 where the adaptive transmission controller processes content through a parallel processing architecture.

10. A non-transitory machine readable medium encoded with machine-executable instructions, wherein execution of the machine-executable instructions is for:

communicating with mobile client devices to render comparisons of insurance plans, or insurance policy rates on the mobile client devices;

processing an on-line request from a native application client resident to one of the mobile client devices;

transmitting content that renders a display of an insurance policy and renders updates to an insurance policy parameter;

generating an insurer's recommended insurance package based on information received from at least one of the mobile client devices;

identifying an insurance package based on data received from the at least one of the mobile client devices from a plurality of insurance packages;

updating the display to highlight the differences between a plurality of insurance line-coverage levels that comprise the insurer's recommended insurance package and a second plurality of insurance line-coverage levels selected by one of the mobile client devices;

processing multiple versions of the insurer's recommended insurance packages in parallel optimized to a plurality of screen sizes and resolutions of the mobile client devices through an adaptive transmission controller; and rendering a modified hyperlink element that comprises an encryption of a user's identity and identifiers to the multiple insurance products;

where the modified hyperlink element activates a network connection, validates a user, and automates a user's logon process; and where the native application client accesses and processes insurance content without access to the Internet.

* * * * *